O. THIEME.
MOTOR DRIVE FOR CALCULATING MACHINES.
APPLICATION FILED AUG. 7, 1911.
1,047,856.
Patented Dec. 17, 1912.
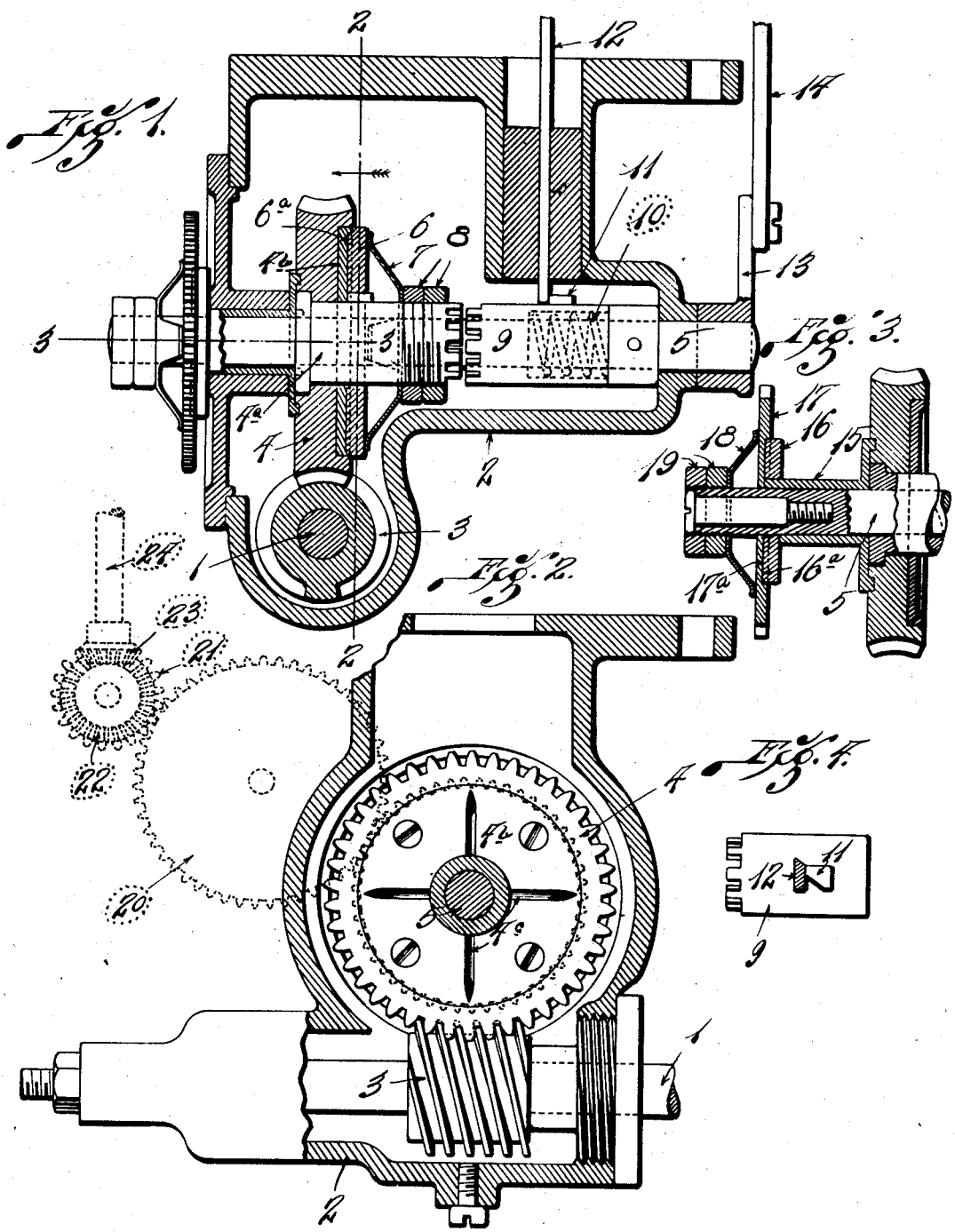
ATTEST
F. W. Harrington
Wm. Janike
INVENTOR.
Otto Thieme
by F. W. Carnwath, Atty.

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

MOTOR-DRIVE FOR CALCULATING-MACHINES.

1,047,856.        Specification of Letters Patent.        Patented Dec. 17, 1912.

Application filed August 7, 1911. Serial No. 642,889.

*To all whom it may concern:*

Be it known that I, OTTO THIEME, a citizen of the United States, residing at St. Louis, Missouri, have invented a certain new and useful Improvement in Motor-Drives for Calculating-Machines, of which the following is a full, clear, and exact description, such as will enable others skilled in the art to which it appertains to make and use the same, reference being had to the accompanying drawings, forming part of this specification, in which,—

Figure 1 is a sectional view through my improved motor drive for calculating machines or the like. Fig. 2 is a sectional view on line 2—2 Fig. 1. Fig. 3 is a detail sectional view on line 3—3 Fig. 1. Fig. 4 is a plan view of one of the driven clutch members.

This invention relates to a new and useful improvement in motor drives for calculating machines or the like, the object being to construct a device of the character described which is simple, cheap and effective, the purpose of my present improvement being to provide means whereby when the machine becomes locked, the motor can continue running without breaking any of the parts.

In the drawings, 1 indicates an armature shaft, which is journaled in suitable bearings in a casing 2, and which carries a reducing worm 3, meshing with a worm gear 4. This worm gear 4 is mounted upon a sleeve $4^a$, journaled on a shaft 5 mounted in the housing 2, preferably at right angles to shaft 1, and on one face thereof carries a plate $4^b$ having radially disposed grooves $4^c$ in its outer face to constitute one member of a friction clutch, of which a disk 6, keyed to sleeve $4^a$ so as to slide thereupon, is the other member. This disk 6 is provided with radial projections $6^a$, equaling in number the grooves $4^c$, and when the parts are in driving connection, these projections fit in the grooves and consequently the worm gear 4 becomes locked to the disk 6 to drive the same.

7 is a spider plate, made of spring metal, whose legs engage the disk 6, and which spider plate is strung on sleeve $4^a$ and held in operative position against the disk 6 by means of nuts 8. One end of sleeve $4^a$ is provided with notches to receive projections extending from a companion clutch member 9 keyed to shaft 5 and having sliding movement thereon. This clutch member 9 is moved toward its companion clutch member by means of a spring 10. The clutch member 9 has a cam faced projection 11, which coöperates with a control bar 12, which bar is lifted by the "motor key" of the machine. When bar 12 is lifted to release the projection 11, the clutch 9 is moved toward its companion member, and when an engagement is effected, locks the shaft 5 into driving engagement with the gear 4. Shaft 5 carries a crank arm 13 at its end, which is connected by a suitable link 14 to the main operating shaft of the machine. In the event that the machine becomes locked, so that the crank 13 is prevented from rotating or continuing to rotate after starting, the form of friction grooves $4^c$ permits the radial ribs $6^a$ to be disengaged therefrom, and consequently, the worm gear 4 may continue to rotate, but the friction disk 6 will remain stationary.

In the drawings, I have also shown means for operating a carriage return mechanism from the constantly running motor, and this means comprises a sleeve 15 fixed to the gear 4, and on whose outer end is fixed a disk 16, said disk having radial projections $16^a$ like those heretofore described.

17 indicates a gear wheel having radial grooves $17^a$ in its face, to coöperate with the radial projection $16^a$. This gear wheel is loosely mounted on the sleeve extension 15 and held against the disk 16 by means of a dish-shaped spider plate spring 18, as shown. Nuts 19 hold the spider plate in operative position. Gear 17 drives a gear 20, which in turn meshes with a pinion 21, conjoined to a bevel gear 23 on the lower end of a shaft 24. Shaft 24 is intended to coöperate with carriage return mechanism not herein shown, as the same forms no part of my present invention. Suffice it to say, however, if the carriage is prevented from turning for any cause, so that shaft 24 is arrested in its rotation, the friction clutch interposed between the worm gear 4 and the carriage returning mechanism, will permit said worm gear to continue its rotation while the carriage return gear remains stationary.

What I claim is—

1. In a device of the class described, a driving shaft, a driven shaft, sleeves on said shafts, a driving wheel loosely mounted on the sleeve on the driving shaft, a friction plate thereon, a friction disk keyed on said sleeve to rotate therewith and longitudinally adjustable thereon, a spring member carried by said sleeve and adjustable longitudinally thereon and adapted to force said disk into engagement with said friction plate, and coöperating clutch members on said sleeves.

2. A motor drive for calculating machines comprising an armature shaft, a driving sleeve, a driven sleeve, means connected to said driven sleeve for operating a main shaft, a driving wheel adapted to be driven from the armature shaft loosely mounted upon the driving sleeve, a friction plate carried by said driving wheel, a friction disk keyed to rotate with the driving sleeve and longitudinally adjustable thereon, tension means for forcing said disk into engagement with said friction plate whereby to lock said driving wheel to said driving sleeve, a second friction disk fixedly mounted upon said driving sleeve, a gear wheel for operating the shaft of the carriage return mechanism loosely mounted upon said driving sleeve and provided with a friction face, adjustable tension means for forcing said gear wheel into engagement with said second friction disk whereby to lock said gear wheel upon said driving sleeve, and coöperating clutch members on the driving sleeve and the driven sleeve.

3. In a motor drive for calculating machines, an armature shaft, a driven shaft for operating the machine, a slidable clutch member on said driven shaft, a sleeve, a driving wheel loosely mounted on said sleeve, a second sleeve fixed to said driving wheel, a carriage return shaft, a gear wheel for driving said carriage return shaft, a friction clutch for engaging said gear wheel with said second sleeve, a friction clutch for engaging said driving wheel with said first mentioned sleeve, and means for engaging said first mentioned sleeve with said driven shaft.

4. A driving mechanism for calculating machines comprising in combination an actuating link for the calculating mechanism, an actuating shaft for the carriage return mechanism, a constantly rotated armature shaft, a driving wheel actuated by said armature shaft, friction means for engaging said driving wheel to operate said link, and friction means for engaging said driving wheel to operate said first mentioned shaft.

5. A driving mechanism for calculating machines comprising a constantly rotated armature shaft, a driving wheel actuated by said shaft, a gear wheel for operating the carriage return shaft, a link for actuating the calculating mechanism, a sleeve free from said driving wheel, and a sleeve fixed to said driving wheel, means for clutching said driving wheel to said free sleeve, and means for clutching said gear wheel to said fixed sleeve.

In testimony whereof I hereunto affix my signature in the presence of two witnesses, this 5th day of August, 1911.

OTTO THIEME.

Witnesses:
M. P. SMITH,
J. HUTTON.